United States Patent [19]

Nazarian et al.

[11] Patent Number: 6,027,329
[45] Date of Patent: *Feb. 22, 2000

[54] PLATEN HAVING INTERNAL SPRING-LIKE CHARACTERISTICS FOR PREVENTING DEFORMATION OF MOLD MOUNTING FACE DURING CLAMPING OPERATIONS

[75] Inventors: Izak Paviz Nazarian, Beverly Hills; John P. Caffrey, Yorba Linda, both of Calif.

[73] Assignee: HPM/Stadco, Inc., Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/818,404

[22] Filed: Mar. 15, 1997

[51] Int. Cl.7 .................................................. B29C 45/64
[52] U.S. Cl. ......................... 425/589; 264/219; 425/451; 425/451.9; 425/590
[58] Field of Search .................................... 425/589, 590, 425/450.1, 451, 451.2, 451.9, 406; 264/219

[56] References Cited

U.S. PATENT DOCUMENTS

| | | | |
|---|---|---|---|
| 3,590,418 | 7/1971 | Hoeschel . | |
| 4,030,186 | 6/1977 | Myers et al. | 29/427 |
| 4,042,660 | 8/1977 | Bishop | 264/77 |
| 4,240,781 | 12/1980 | Flickinger et al. | 425/450.1 |
| 4,312,828 | 1/1982 | Flickinger et al. | 264/349 |
| 4,421,467 | 12/1983 | Richmond | 425/136 |
| 4,726,754 | 2/1988 | Breuker et al. | 425/406 |
| 4,744,740 | 5/1988 | Kojima | 425/107 |
| 4,874,309 | 10/1989 | Kushibe et al. | 425/589 |
| 4,886,106 | 12/1989 | Bennett | 164/70.1 |
| 4,906,173 | 3/1990 | Inaba et al. | 425/589 |
| 4,938,682 | 7/1990 | Kadoriku et al. | 425/593 |
| 5,249,951 | 10/1993 | Leonhartsberger et al. | 425/589 |
| 5,354,196 | 10/1994 | Ziv-Av | 425/589 |
| 5,513,977 | 5/1996 | Kitajima | 425/593 |
| 5,538,418 | 7/1996 | Stinnett | 431/253 |
| 5,565,224 | 10/1996 | Stillhard | 425/589 |
| 5,593,711 | 1/1997 | Glaesener | 425/595 |
| 5,776,402 | 7/1998 | Glaesener | 264/239 |

FOREIGN PATENT DOCUMENTS

| | | |
|---|---|---|
| 4004026 A1 | 8/1990 | Germany . |
| 61-233519 | 10/1986 | Japan . |
| WO 97/31770 | 4/1997 | WIPO . |

OTHER PUBLICATIONS

The Hydraulic Press Manufacturing Co., HPM Catalog, 1913 Edition, Catalogue No. 40, pp. 76–77, 104–105, and 118–119.

*Primary Examiner*—Tim Heitbrink
*Attorney, Agent, or Firm*—Faegre & Benson LLP

[57] ABSTRACT

A platen to be operationally coupled to a plurality of tie bars and which is suitable for supporting a mold element in a clamping operation in which the platen is subjected to clamping forces. The platen includes a mold supporting section comprising a mold support member having a mold mounting surface for receiving the mold element. A plurality of tie bar engaging members are spaced apart from the mold supporting section. A flexible interconnecting structure comprises at least one interconnecting element which interconnects at least tie bar engaging member to the mold supporting section. The interconnecting element is placed under tension during the clamping operation to allow the tie bar engaging member to deflect upward relative to the mold supporting section in response to the clamping forces acting against the platen.

50 Claims, 13 Drawing Sheets

«6,027,329»

PLATEN HAVING INTERNAL SPRING-LIKE CHARACTERISTICS FOR PREVENTING DEFORMATION OF MOLD MOUNTING FACE DURING CLAMPING OPERATIONS

FIELD OF THE INVENTION

This invention is in the field of platens which are used in equipment such as injection molding machines, die casting machines and presses. More specifically, this invention relates to platens with built-in spring characteristics for accommodating clamping forces so that the operational faces of such platens remain substantially deformation free during clamping operations.

BACKGROUND OF THE INVENTION

Injection molding machines, die casting machines, and presses generally operate on an automated basis to sequentially mold large quantities of substantially identical parts with relatively little attention required by the operator. Injection molding machines in particular are in extremely widespread use for manufacturing a wide range of articles, including toys, household items, machine components, engine components, aircraft parts, marine parts, and spacecraft components, just to name a few of the many areas in which injection molded items are used. Indeed, a substantial portion of any and all items manufactured from thermosetting or thermoplastic polymers are made using injection molding techniques.

A typical injection molding machine includes a stationary platen and a moveable platen supported upon a frame structure. The stationary platen is fixed in place on the frame structure, and the moveable platen is slideable along the frame structure to allow the moveable platen to move toward and away from stationary platen in a rectilinear fashion. To help guide and support the moveable platen as it moves along the frame structure, the moveable platen is slideably supported upon tie bars, usually four in number, which are rigidly connected to stationary platen at one end and coupled to other componentry of the injection molding machine at their other end.

In a typical injection molding operation, a pair of complementary mold elements, or "mold halves", are provided which define a mold cavity when the mold elements are clamped together. The mold elements are mounted to the moveable and stationary platens, respectively, in a manner such that relative movement of the moveable platen towards the stationary platen causes the mold elements to be registrably clamped together, thus closing the mold cavity. Sufficient clamping force is usually applied to the mold elements so that molten molding material does not seep from the interface between the mold elements during the injection step in which molten material is injected into the mold cavity under pressure. After injection, the molten material is allowed and/or caused to solidify in the mold cavity to form a molded part. The moveable platen and its corresponding mold element are then driven away from the stationary platen, thus opening the mold cavity. The part is then ejected, and the cycle may be repeated.

One problem that continues to be associated with injection molding machines, and platens in particular, concerns the deformation of one or both platens that tends to occur during molding operations. During molding operations, substantial force is generated against the center region of each mold mounting face of the platens, and additional forces are generated against the backsides of each platen at the regions proximal to the locations at which the tie bars operationally engage each platen. Generally, such forces tend to cause the mold mounting faces of each platen to concavely deform. Such deformation undesirably causes a gap to form between the mold elements. This allows molten material injected into the mold cavity to leak from the gap, resulting in flash and/or other defects in the molded part. Even robust, heavy, block-shaped platens previously known in the art are subject to this kind of deformation problem.

Platens could be made extremely thick to avoid the deformation problem. However, this approach results in heavy platens and large-sized machines adapted to handle such heavy platens. This is not ideal, though, because it is generally desirable for platens to be as light and small as possible for speed and fast cycle times.

There exists, therefore, a need for a practical way in which complementary mold elements can be mounted to cooperating platens and then forcefully clamped together without causing deformation of the mold mounting face of either the moveable and/or stationary platens during molding operations.

SUMMARY OF THE INVENTION

The present invention provides platens suitable for use in presses, die casting machines, injection molding machines, and the like. The platens of the present invention include internal spring-like characteristics for preventing deformation of the mold mounting faces of such platens during clamping operations. As a result, gap formation between mold elements is avoided, and flash and part defects due to platen deformation are substantially completely eliminated. Additionally, the spring-like structure of the platens of the present invention further helps to absorb clamping forces, which advantageously helps extend the service life of the tie bars and associated mechanisms.

Advantageously, the present invention can be used in combination with an extremely wide range of clamping forces, e.g., from about 200 to about 10,000 tons, preferably 400 to 5,000 tons, without experiencing substantially any deformation of platen mold mounting faces which might otherwise cause gap formation between mold elements during molding operations. This makes the present invention extremely versatile for use in many different kinds of molding operations.

Furthermore, the platens of the present invention not only substantially eliminate mold face distortion during clamping operations, but the platens of the present invention also advantageously remain substantially distortion-free even when using mold elements characterized by a wide range of sizes. The ability of the platens of the present invention to work in combination with a wide range of mold sizes further enhances the versatility of the present invention.

In one aspect, the present invention provides a platen to be operationally coupled to a plurality of tie bars and which is suitable for supporting a mold element in a clamping operation in which the platen is subjected to clamping forces. The platen includes a mold supporting section comprising a mold support member having a mold mounting surface for receiving the mold element. A plurality of tie bar engaging members are spaced apart from the mold supporting section. A flexible interconnecting structure comprises at least one interconnecting element which interconnects at least one tie bar engaging member to the mold supporting section. The interconnecting element is placed under tension during the clamping operation to allow the tie bar engaging member to deflect upward relative to the mold supporting section in response to the clamping forces acting against the platen.

In another aspect, the present invention provides a platen, including a mold supporting section, a plurality of tie bar engaging members, and a flexible interconnect structure. The mold supporting section includes a base section having a top portion, a bottom portion, and an intermediate portion interconnecting the top and bottom portions. The mold supporting section further includes a mold support member having a top mold mounting surface and is supported on the top portion of the base section. The base section and the mold support member are sufficiently robust such that the top mold mounting face undergoes substantially no deformation in a clamping force range from about 200 tons to about 500 tons. The plurality of tie bar engaging members are spaced apart from the mold supporting section. The flexible interconnect structure couples the tie bar engaging members to the base section in a manner to allow one or more of the tie bar engaging members to deflect in response to the clamping forces acting against the platen during the clamping operation.

In a further aspect, the present invention provides a platen having a central base section having a peripheral sidewall, a top portion, and a bottom portion. A mold support member having a top mold mounting surface is supported on the top portion of the central base section. A plurality of tie bar engaging members are positioned outward and spaced apart from the mold supporting section. Each tie bar engaging member has an upper portion and a lower portion. An upper interconnecting element extends outward and diagonally upward from the central base section and interconnects the center base section with an upper portion of at least one tie bar engaging member. A lower interconnecting element extends outward from the central base section and interconnects the center base section with a lower portion of at least one tie bar engaging member.

In still yet another aspect, the present invention relates to an injection molding machine of the type including at least one platen operationally coupled to a plurality of tie bars. The platen includes a mold supporting section comprising a mold support member having a mold mounting surface for receiving a mold element. A plurality of tie bar engaging members are spaced apart from the mold supporting section. A flexible interconnecting structure includes at least one interconnecting element which interconnects at least one tie bar engaging member to the mold supporting section. The interconnecting element is placed under tension during the clamping operation to allow the tie bar engaging member to deflect upward relative to the mold supporting section in response to clamping forces acting against the platen.

In a further aspect, the present invention relates to a method of forming a molded article. In an initial step, first and second complementary mold elements are provided. The mold elements define a mold cavity when the first and second mold elements are registrably clamped together. The first mold element is mounted to a first platen and the second mold element is mounted to a second platen. The first and second platen are operationally coupled to a plurality of tie bars such that the first and second platens are capable of relative movement toward and away from each other in order to registrably clamp and unclamp the first and second mold elements to thereby define the mold cavity. The mold elements are registrably clamped together, and molten material is injected into the mold cavity. The molten material is solidified in the mold cavity to form a molded part. The first and second platens are then moved relatively away from each other in order to unclamp the first and second mold elements thereby opening the mold cavity and allowing the molded part to be removed. At least one of the first and second platens comprises a platen as described above with respect to any of the preceding aspects of the present invention.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1:
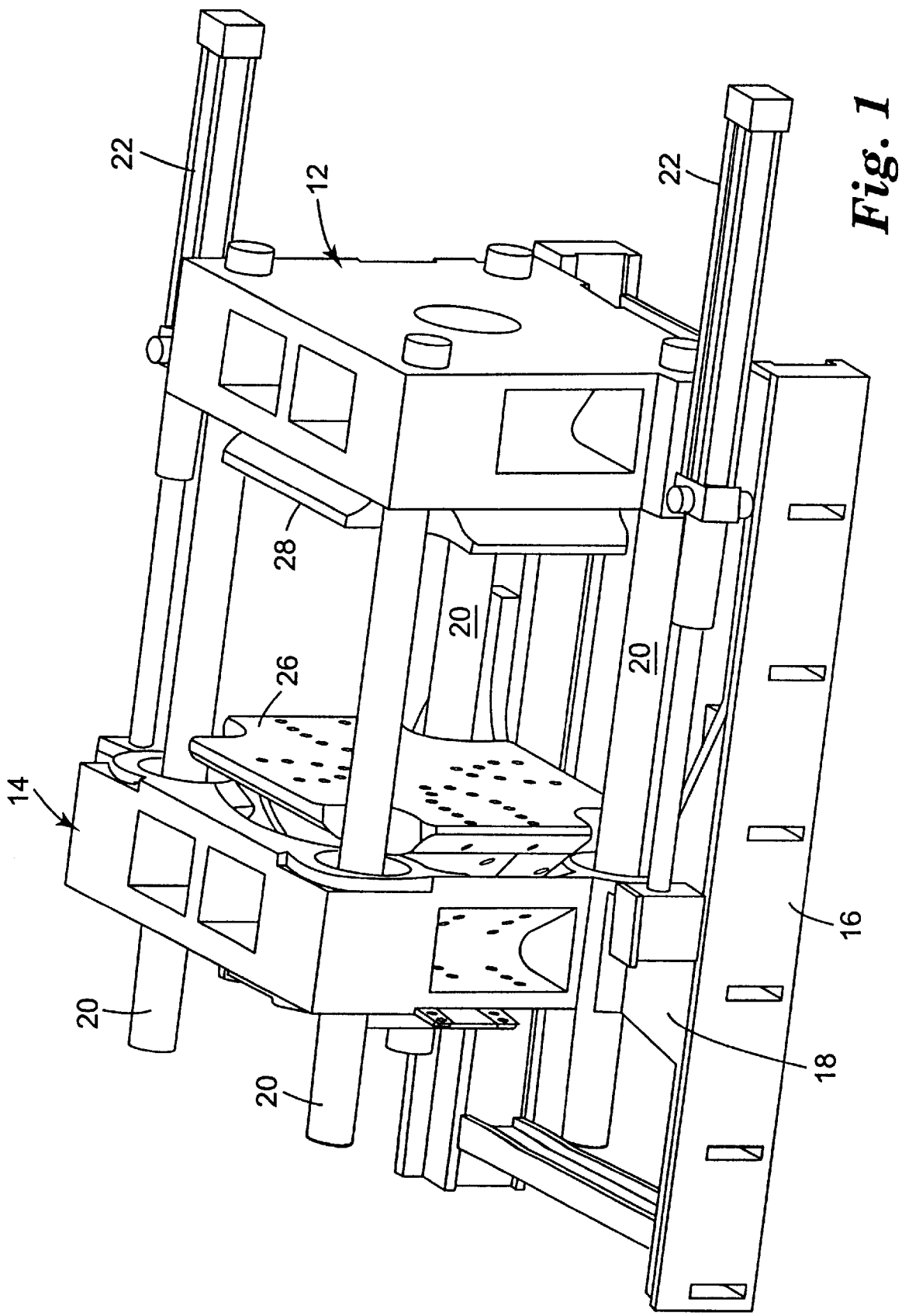
FIG. 1 is a perspective view of a portion of an injection molding machine including moveable and stationary platens configured in accordance with the principles of the present invention.

FIG. 1 shows a portion of an injection molding machine 10 which includes a stationary platen 12 and a moveable platen 14 supported upon frame structure 16. Stationary platen 12 is fixed in place on frame structure 16 by any suitable securing means, including bolts, screws, clamps, glue, welds, and the like. Moveable platen 14 is slidingly coupled to frame structure 16 by feet 18, which allow moveable platen 14 to move toward and away from stationary platen 12 in a rectilinear fashion along frame structure 16. To help guide moveable platen 14 as it moves along frame structure 16, moveable platen is operationally coupled to tie bars 20 which are rigidly connected to stationary platen 12 at one end and coupled to other componentry (not shown) of injection molding machine 10 at their other end. In the practice of the present invention, either platen 12 or platen 14, or preferably both of platens 12 and 14 as shown in FIG. 1, may be configured in accordance with the principles of the present invention.

Hydraulic mechanisms 22 are operationally coupled to moveable platen 14 and may be actuated to cause movement of moveable platen 14 towards and away from stationary platen 12. During the clamping phase of an injection molding cycle, it may be desirable to apply more clamping force to moveable platen 14 than is provided by hydraulic mechanisms 22 by themselves, inasmuch as mechanisms 22 are primarily intended to accomplish only gross movement of moveable platen 14. Therefore, additional clamping force may be applied to moveable platen 14, most preferably on the backside 24 at surface regions proximal to the tie bars 20. For example, according to one approach known in the art, additional hydraulic mechanisms (not shown) are provided at each tie bar location on backside 24 in order to generate such additional clamping force.

FIG. 1 shows injection molding machine 10 with a configuration in which stationary platen 12 is positioned at the ends of tie bars 20, and moveable platen is slideable towards stationary platen 12 in a direction from an interior portion of tie bars 20 towards the ends of tie bars 20. However, other configurations are also within the scope of the present invention. As an alternative, the positions of platens 12 and 14 could be switched so that stationary platen 12 would be fixed at a location inward from the ends of tie bars 20, and moveable platen 14 would then move towards stationary platen 12 in a direction from the ends of tie bars 20 towards an interior portion of tie bars 20. Additionally, as another alternative, injection molding machine 10 could be provided with two moveable platens in which one or both of such platens would be configured in accordance with the principles of the present invention.

FIGS. 2–7 show one preferred embodiment of moveable platen 14 in more detail. Moveable platen 14 includes mold support section 30 which, in turn, includes centrally located base section 32 having a top portion 34, a bottom portion 36, and intermediate portion 38 interconnecting bottom portion 36 and top portion 34. Peripheral sidewall 39 extends from bottom portion 36 to top portion 34. Base section 32 may have any of a variety of shape configurations as desired. For example, base section 32 can be generally cylindrically shaped with a substantially circular or oval cross-section, pyramidal shaped with a square, rectangular, or triangular cross-section, cone-shaped, rectilinear, or the like. In the preferred embodiment shown in FIGS. 2–7, base section 32 is substantially cylindrically shaped having a generally circular cross section (see FIG. 6 in particular), subject to preferred modifications to such configuration which will be described in more detail below.

Mold support member 40 is supported upon top portion 34 of base section 32. Mold support member 40 includes mold mounting surface 42 for receiving a mold element (not shown) complementary to a corresponding mold element (not shown) to be mounted to the mold mounting surface 28 of stationary platen 12 (see FIG. 1). In accordance with standard practices, the mold elements are configured to define a mold cavity corresponding to a part to be molded when the mold elements are clamped together. For purposes of defining the relative orientation of the various features of moveable platen 14, and for characterizing the clamping forces acting upon platen 14 during clamping operations, mold support member 40 shall be deemed to be at the top of platen 14, regardless of the orientation of platen 14 when it is installed in a press, injection molding machine, or the like. Accordingly, arrow 31a shall be deemed to correspond to the "upward" direction, and arrows 31b and 31c would indicate upward diagonal directions (see FIGS. 4–7). Similarly, arrow 33a shall be deemed to correspond to the "downward" direction, and arrows 33b and 33c would indicate downward diagonal directions (see FIGS. 4–7). Thus, platen features located relatively "upward" are deemed to be at or towards the top of platen 14, and platen features located relatively "downward" are deemed to be at or towards the bottom of platen 14.

Mold support member 40 has an outer periphery 44 positioned radially outward from base section 32. Preferably, as shown best in FIGS. 3, 4, 5, and 7, outer periphery 44 extends radially upward and outward around substantially the entire perimeter of peripheral sidewall 39. In this way, mold support member 40 is provided with bottom surface 46 extending around the entire perimeter of top portion 34. In the preferred embodiment shown in the Figures, the taper of bottom surface 46 effectively transfers clamping forces acting on a relatively wide area of mold mounting surface 42 to base section 32. It is also preferred that base section 32 and mold support member 40 are sufficiently robust such that the top mold mounting face undergoes substantially no deformation in a clamping force range from about 200 tons to about 10,000 tons. Preferably, deformation is avoided in a clamping force range from about 200 tons to 5,000 tons, more preferably 400 tons to 5000 tons.

Figure 2:
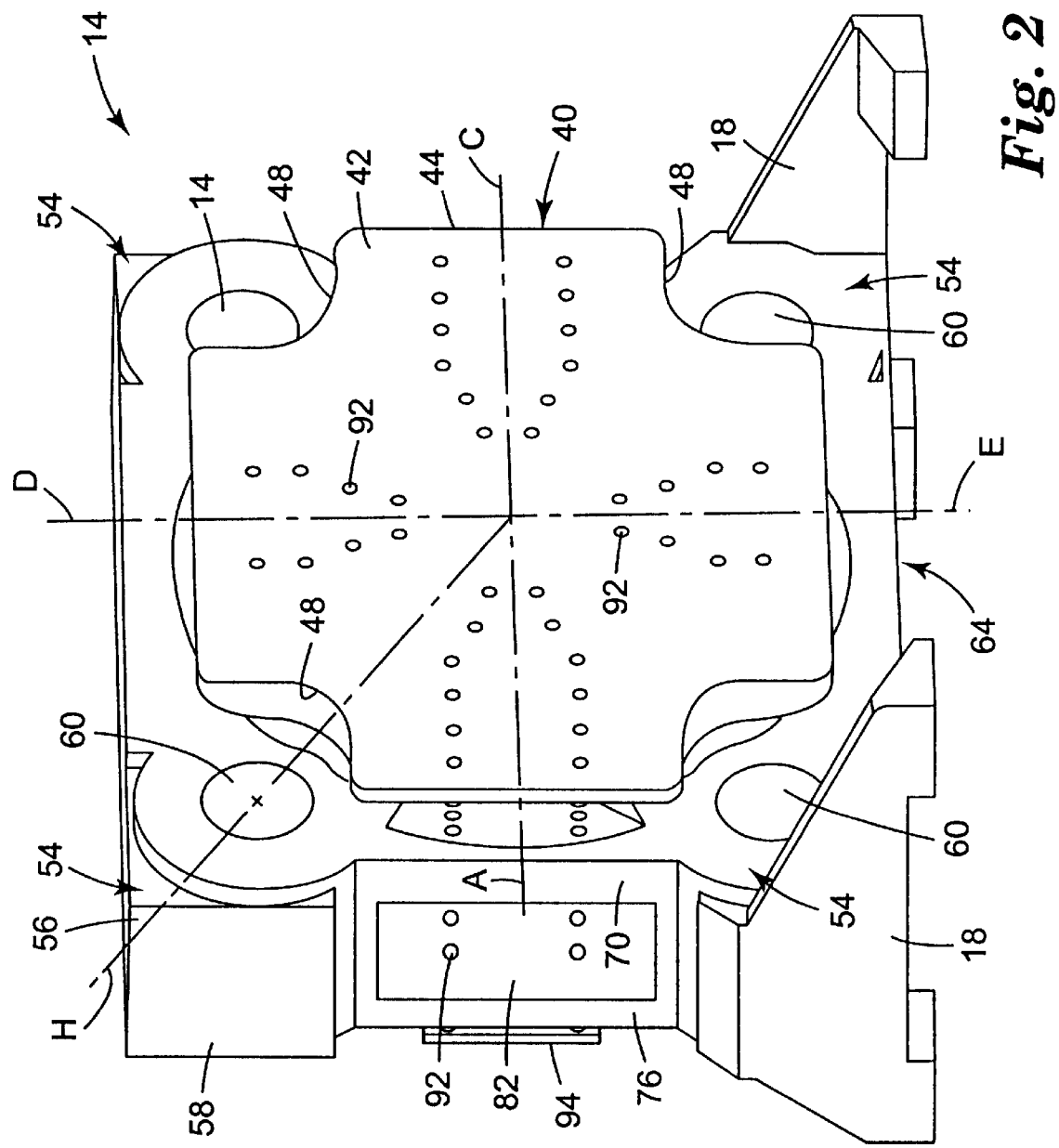
FIG. 2 is a perspective view of the moveable platen of FIG. 1 from a view point looking downward onto the mold mounting face, i.e., top, of the platen.
Figure 3:
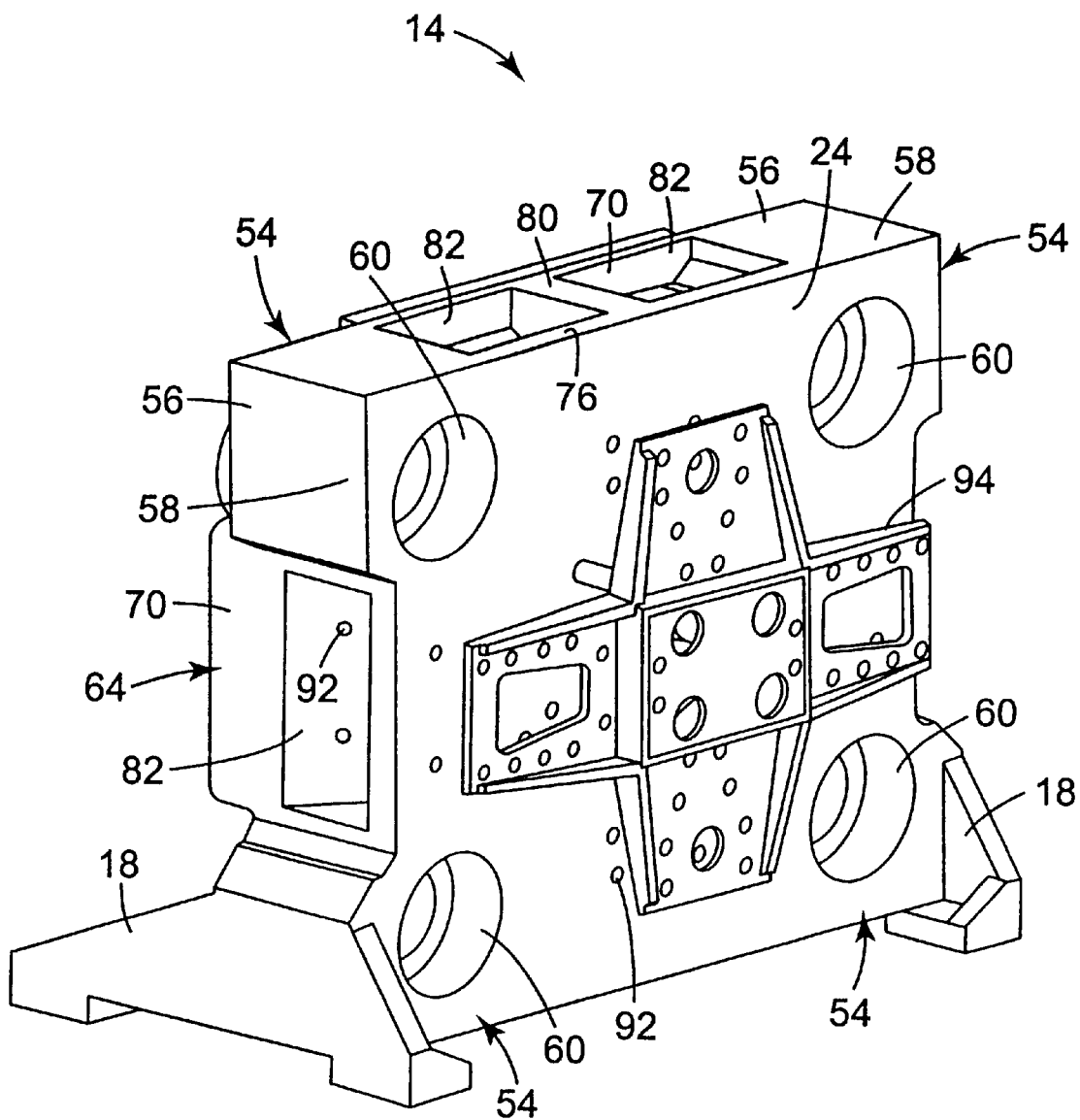
FIG. 3 is a perspective view of the moveable platen of FIG. 1 from a view point looking at the backside, i.e., bottom of the platen.

As perhaps best seen in FIGS. 1 and 2, outer periphery 44 of mold support member 40 has a generally rectilinear perimeter having four corner regions, although other configurations could be used if desired. The corner regions of rectilinear mold support member 40 include cut out portions 48 to accommodate transport of moveable platen 14 along tie bars 20 (See FIG. 1) in a manner such that mold support member 40 is spaced apart from and out of contact with tie bars 20. In this way, any deflection of tie bars 20 induced by clamping forces will not be imparted to mold mounting surface 26. Mold mounting surface 26 thus remains substantially deformation-free during clamping operations.

Referring again collectively to FIGS. 2–7, a plurality of tie bar engaging members in the form of tie bar housings 54 are spaced outward and apart from base section 32 of mold supporting section 30. In the preferred embodiment, moveable platen 14 includes four tie bar housings 54, although a greater or lesser number could be used as desired. Each tie bar housing 54 includes an upper portion 56, a lower portion 58, and an aperture for operationally coupling each housing 54 to a corresponding tie bar 20. The tie bar housings 54 are also spaced apart from each other around the periphery of moveable platen 14 Each tie bar housing 54 also includes an aperture 60 for fitting over a corresponding tie bar 20 (see FIG. 1).

Each tie bar housing 54 is coupled to mold supporting section 30 by a flexible interconnecting structure generally designated as 64. In the practice of the present invention, flexible interconnecting structure 64 may be formed from a plurality of distinct structures associated with each individual tie bar housing 54, respectively. Alternatively, and more preferably as shown in the Figures, all of the housings 54 are coupled to the same flexible interconnecting structure 64 which is disposed around substantially the entire periphery of mold mounting section 30.

Figure 4:
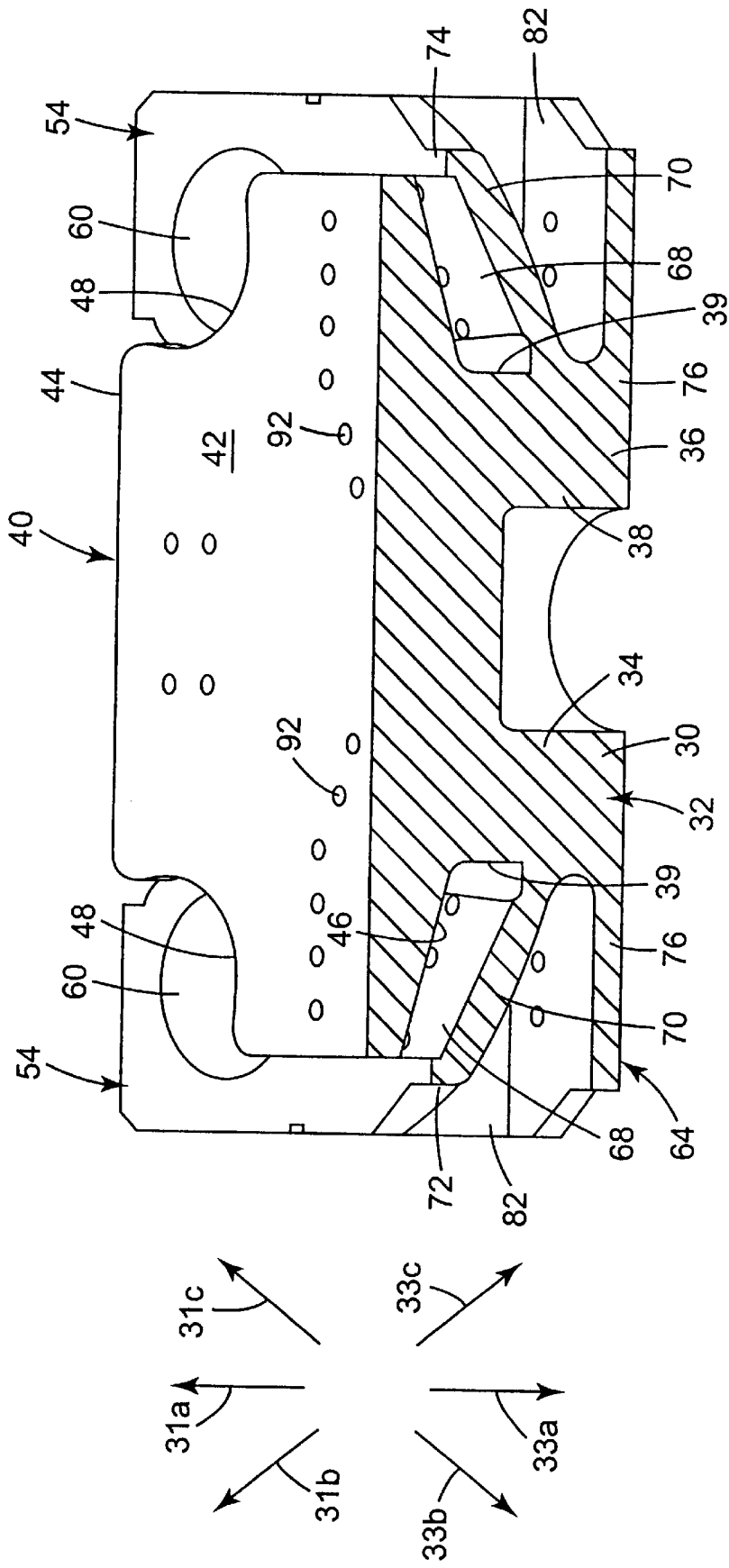
FIG. 4 is a perspective view of the moveable platen of FIG. 1 with a half section broken away along a midline axis not including strengthening ribs.
Figure 5:
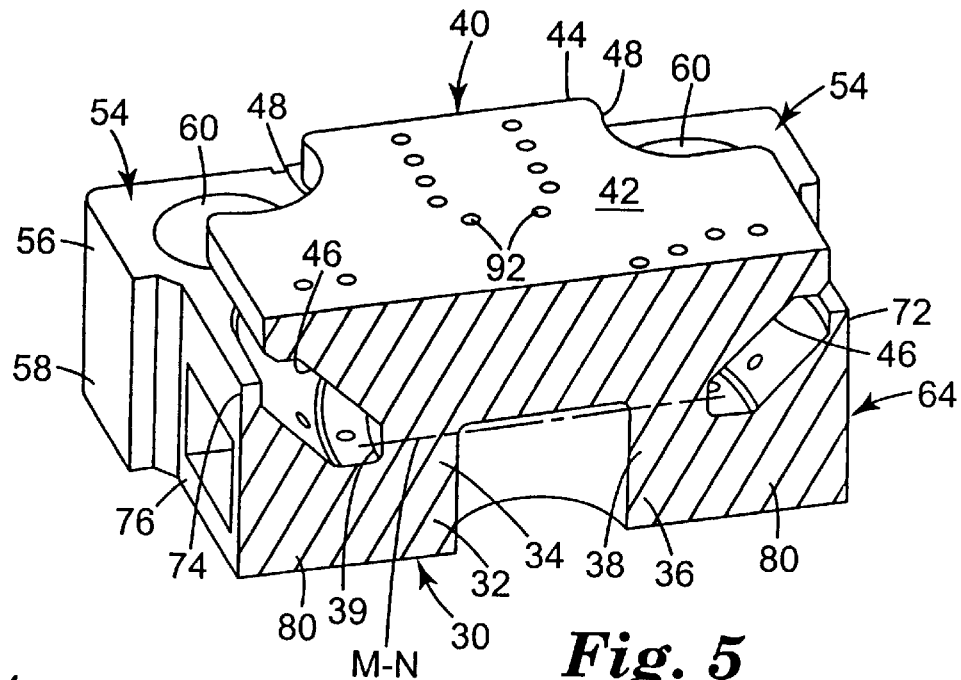
FIG. 5 is a perspective view of the moveable platen of FIG. 1 with a half section broken away along a midline axis including strengthening ribs.
Figure 7:
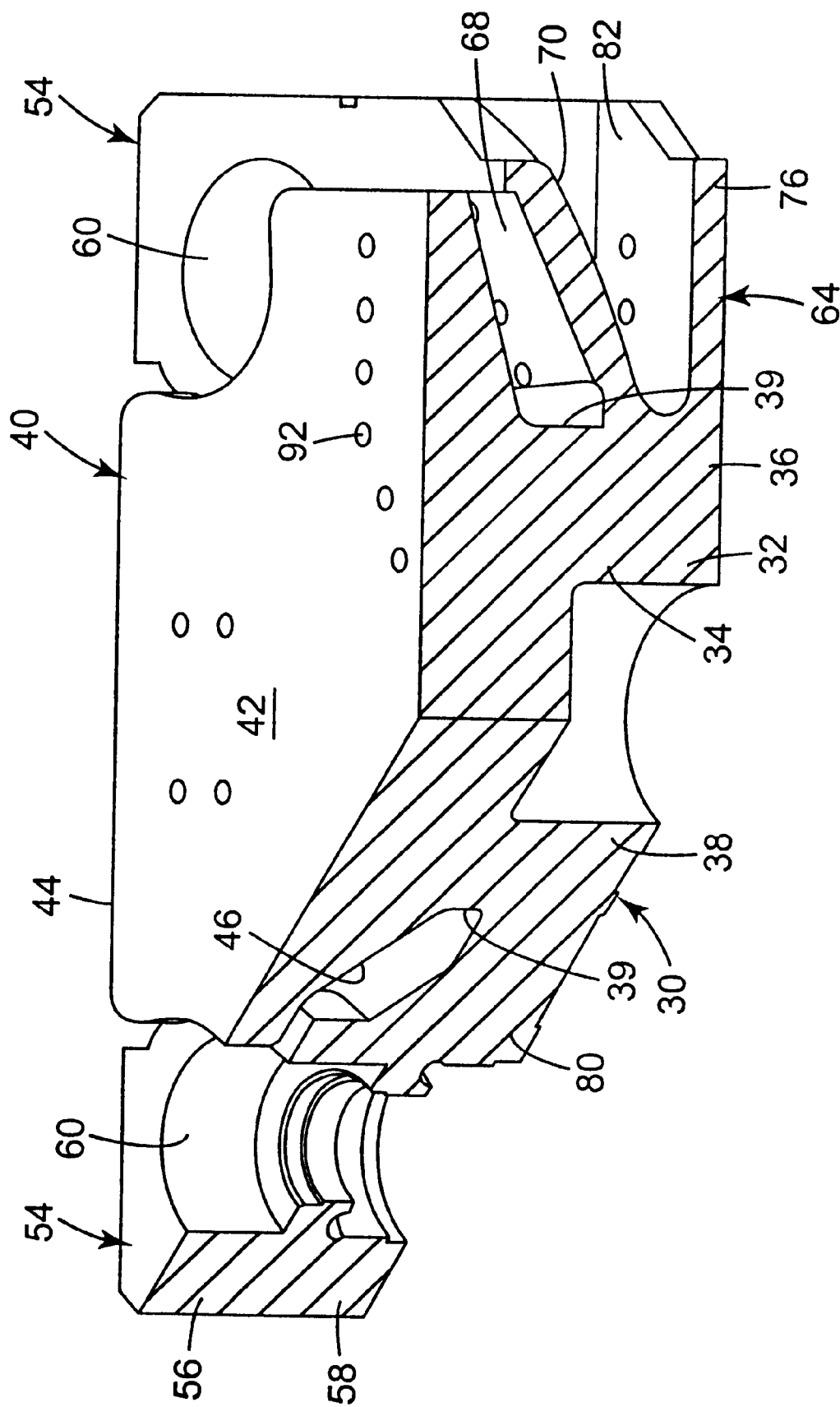
FIG. 7 is a perspective view of the moveable platen of FIG. 1 with a two-thirds section broken away to show a half cross section along a diagonal axis including a strengthening rib and along a midline axis not including a strengthening rib.

In the preferred embodiment as best shown in FIGS. 4, 5, and 7, flexible interconnecting structure 64 comprises upper interconnecting element 70, lower interconnecting element 76, and strengthening ribs 80. In effect, the elements 70 and 76 preferably project outward from base section 32 much like cooling fins extend outward from the cylinder of an internal combustion engine. Upper interconnecting element 70 extends outward and upward from base section 32 and has an outer periphery 72 including upward extending flange 74. Outer periphery 72 of upper interconnecting element 70 is shown in this embodiment with a substantially rectilinear shape having four corner regions, although other configurations could be used if desired. Upper interconnecting element 70 interconnects base section 32 with an upper portion 56 of each tie bar housing 54. Each tie bar housing 54 is coupled to upper interconnecting element 70 at the corner regions of element 70, respectively. Advantageously, the upward angle of upper interconnecting element 70 in a direction from base section 32 to tie bar housing 54 allows element 70 to bend and tensionably deform during a clamping operation and thereby allow tie bar housings 54 to deflect upward. This bending and tensioning of element 70 and deflection of housings 54 absorbs a sufficient amount of the clamping forces such that mold mounting surface 40 would not be distorted by those forces. In the practice of the present invention, upper interconnecting element 70 also experiences some degree of shear forces. Thus, other forces can act upon element 70, although it is most desirable if the tension forces are dominant.

Lower interconnecting element 76 extends radially outward from base section 32 and has outer periphery 78. Like outer periphery 72 of element 70, outer periphery 78 of lower interconnecting element 76 is shown in this embodiment with a substantially rectilinear shape having four corner regions, although other configurations could be used if desired. The outer peripheries 72 and 78 of the elements 70 and 76 are registrably aligned such that the corner regions of the lower element 76 are positioned substantially directly below the corner regions of upper element 70. Lower interconnecting element 76 interconnects base section 32 with a lower portion 58 of each tie bar housing 54. Each tie bar housing 54 is coupled to lower interconnecting element 76 at the corner regions of element 76, respectively. As seen best in FIGS. 4, 5, and 7, the distance between the upper and lower elements 70 and 76 is greater proximal to the tie bar housings 54 as compared to the distance between elements 70 and 76 proximal to base section 32. Advantageously, this configuration allows lower interconnecting element 76 to reduce the bending moment characteristics of upper interconnecting element 70, as will be described in more detail below. Additionally, the spacing between elements 70 and 76 forms pockets 82 on the sides of moveable platen 14 which help reduce the overall weight of platen 14 as compared to an embodiment of a platen in which upper and lower elements 70 and 76 were to be formed from a single, integral piece with no such pockets.

A plurality of strengthening ribs 80 are positioned between the upper and lower interconnecting elements 70 and 76. Moveable platen 14 is shown as having a total of six such ribs 80. Four (one of which is seen in the cross-sectional view of FIG. 7) extend radially between elements 70 and 76 from base section 32 towards each tie bar housing 54. Two additional strengthening ribs 80 (shown in the cross-sectional view in FIG. 5) are positioned on opposing sides of the platen 14, extending radially between elements 70 and 76 along a midline axes 88 (see FIG. 6) of the platen from base section 32 toward positions on outer peripheries 72 and 78 which are intermediate housings 54. Although moveable platen 14 is shown as having six such ribs 80, a greater or lesser number of ribs could be used in alternative embodiments as desired. For example, for a smaller sized platen in which the spacing between tie bar housings is less than that shown in FIGS. 2–7, no strengthening ribs may be necessary and/or desirable along either midline axis or along either diagonal axis. On the other hand, for a larger sized platen, it may be desirable to provide one or more additional strengthening ribs on each side of the platen.

Referring again collectively, to FIGS. 2–7, it can be seen that at least the outer peripheral portion of bottom surface 46 of the preferred embodiment is positioned above and spaced apart from upper interconnecting element 70. The spacing between surface 46 and element 70 defines an open channel 68 which extends around, and angles downward toward, substantially the entire periphery of base section 32. Advantageously, this preferred configuration allows flexible interconnecting structure 64 to deform, and tie bar housings 54 to deflect upward, in amounts sufficient to accommodate clamping forces without having structure 64, tie bars 20, or housings 54 physically contact any part of mold support member 40 during a clamping operation.

Figure 8:
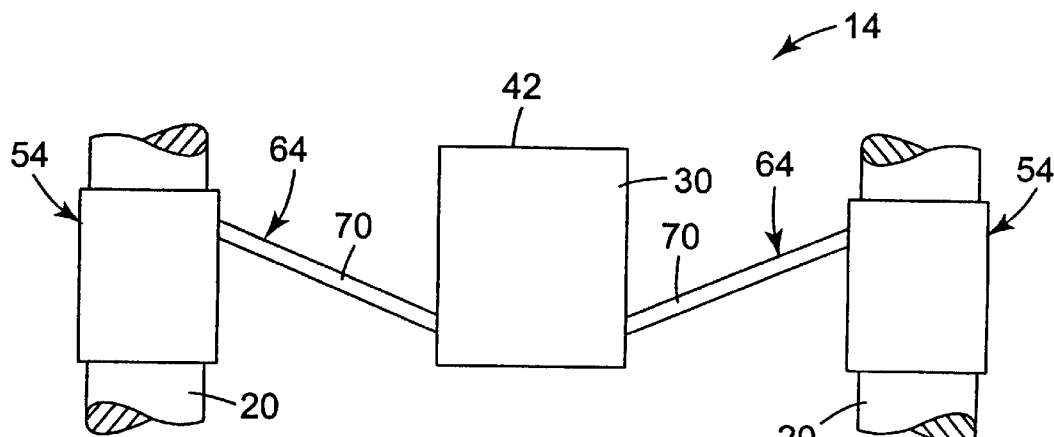
FIG. 8 is a schematic representation of a side view of the moveable platen of FIG. 1 showing the platen in its free state.
Figure 9:
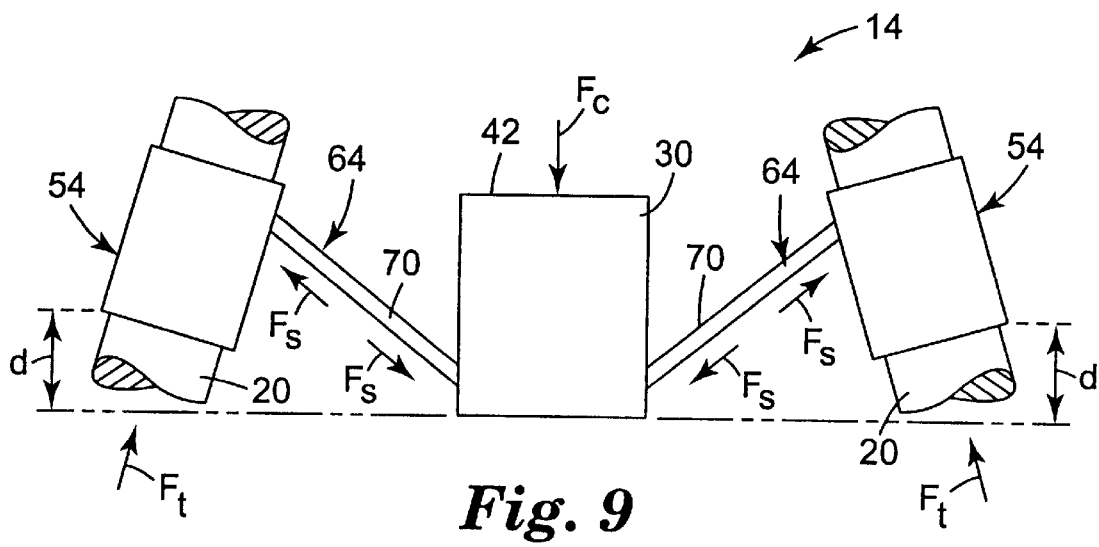
FIG. 9 is a schematic representation of a side view of the moveable platen of FIG. 1 showing the deflection of the tie bar engaging members in response to clamping forces.
Figure 10:
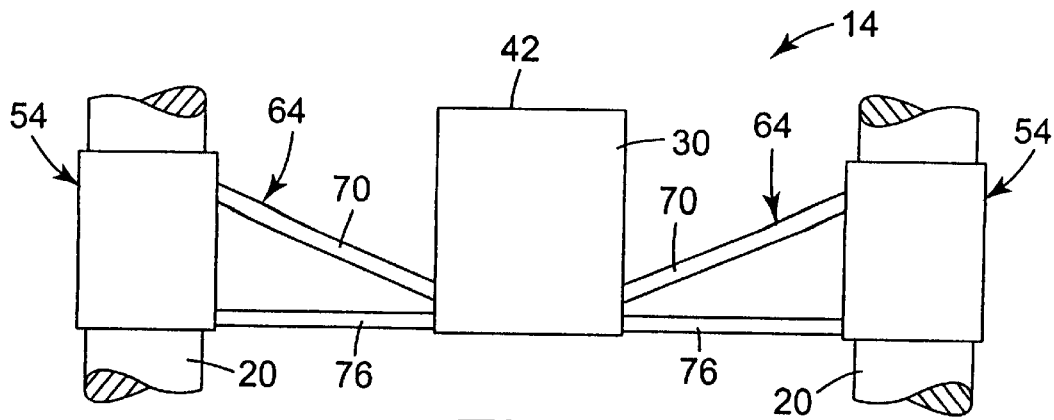
FIG. 10 is a schematic representation of a side view of the moveable platen of FIG. 1 showing an additional interconnecting element used to stiffen the spring characteristics of a flexible interconnecting structure coupling the tie bar engaging members to the mold support section.

The function of flexible interconnecting structure 64 will now be explained with reference to the schematic representations of moveable platen 14 shown in FIGS. 8–10. FIGS. 8 and 10 show moveable platen 14 in the free state in which no clamping forces are acting on the platen, and FIG. 9 shows moveable platen 14 during a clamping operation in which clamping forces $F_t$ and $F_c$ are acting on the platen, such that tie bar housings 54 have been deflected upward. In FIG. 9, for comparison purposes, the free state position of moveable platen 14 is denoted by dotted lines, and the tensile and bending deformation of structure 64 and the deflection of the tie bar housings 54 has been exaggerated for purposes of illustration. In actual practice, the upward deflection of the outside corner of the tie bar housings, denoted by the distance d, will not be as great as is shown. The actual amount of such deflection will depend upon a number of factors, including the material from which the platen 14 is formed, the dimensions of the flexible interconnecting structure 64, clamping conditions, and the like. For typical molding operations involving clamping forces in the range of 200 to 5000 tons, upward deflection d in the range from 5 mm to 50 mm, preferably 15 mm to 20 mm, would be likely to be observed in practice, and such deflection would be suitable for absorbing clamping forces when using structures configured in accordance with moveable platen 14 or stationary platen 12.

As can be seen from FIG. 9, flexible interconnecting structure 64 acts much like a spring plate linking the tie bar housings 54 with the mold supporting section 30. In acting like a spring plate, flexible interconnecting structure 64 is sufficiently tensionably deformable during clamping operations to allow tie bar housings 54 to deflect upward relative to the mold supporting section 30 in a manner such that the mold mounting surface 26 remains substantially distortion free. Arrows $F_s$ denote the forces acting on the flexible interconnecting structure 64 which place the structure under tension to allow the structure 64 to tensionably deform as needed to accommodate the clamping forces. In particular, note how the mold supporting section 30 itself undergoes substantially no tension or compression induced deformation during the clamping operation. Instead, the clamping forces are absorbed by the tensile deformation of flexible interconnecting structure 64 and deflection of tie bar housings 54.

FIGS. 8 and 9 schematically show flexible interconnecting structure 64 as having only a single structural element 70 interconnecting the tie bar housings 54 to the mold supporting section 30. In embodiments and/or molding operations in which use of only a single structural element 70 is too flexible, i.e., the tie bar housings 54 deflect so much that the integrity of tie bars 20 is threatened, it may be desirable to provide additional structure such as extra thickness proximal to the tie bar housings, or more preferably, the additional structural element 76 as shown in FIG. 10, in order to reduce the bending moment of flexible interconnecting structure 64. This principle of using additional structure for stiffening purposes is embodied in the preferred platen embodiments 12 and 14 shown in detail in FIGS. 2–7. In those detailed embodiments, upper interconnecting element 70 is tensionably flexible to accommodate clamping forces, and lower interconnecting element 76 reduces the bending moment of flexible interconnecting structure 64 so that structure 64 as a whole is not too flexible.

Figure 6:
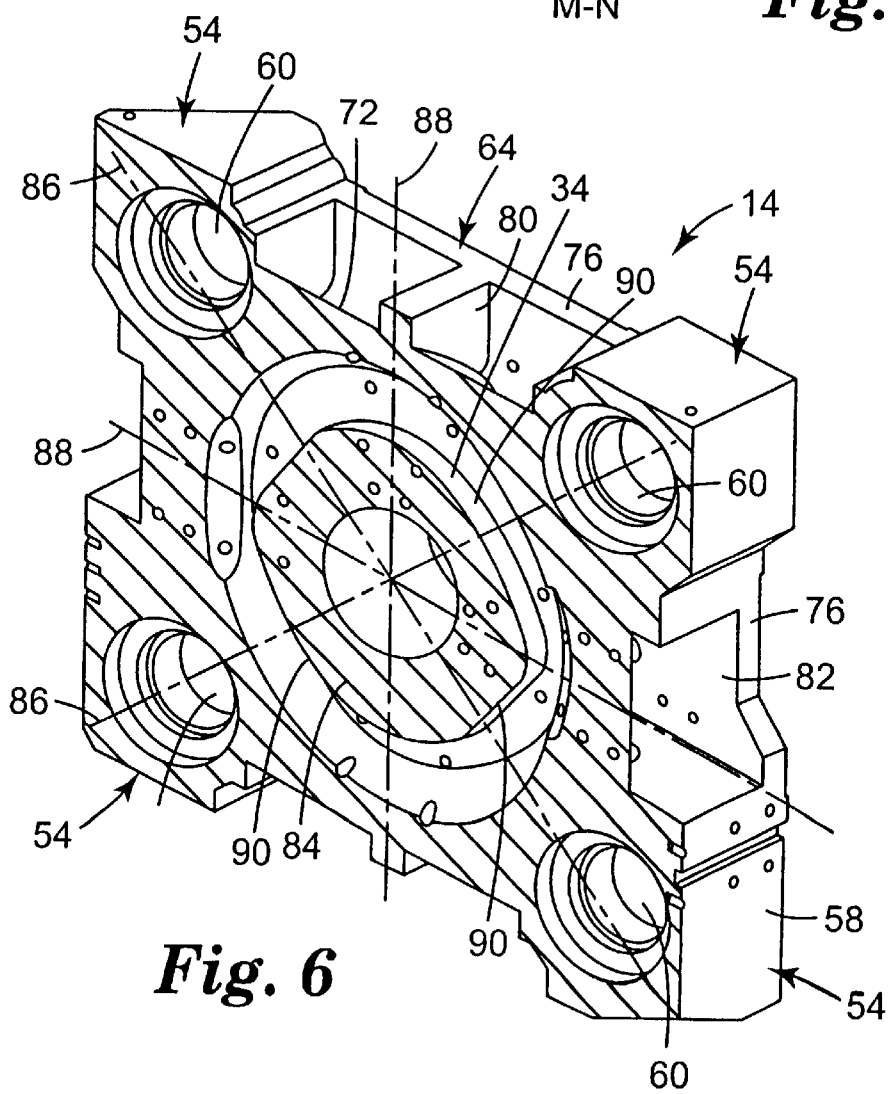
FIG. 6 is a perspective view of the moveable platen of FIG. 1 with a top portion broken away to show a cross section of the base section top portion.

A preferred structural feature of base section 32 is shown in the view of a horizontal cross-section 84 of base section 32 shown in FIG. 6. As seen from this Figure, the peripheral sidewall 39 of base section 32 comprises flattened sidewall portions 90 opposing tie bar housings along the diagonal axes 86 between base section 32 and the tie bar housings 54. The flattened sidewall portions 90 are characterized by a flattened degree of curvature relative to the degree of curvature of the sidewall of a perfect cylinder. This preferred feature of the present invention helps distribute forces generated during clamping operations. For example, during clamping operations, deflection of tie bar housings 54 may tend to generate compression forces along diagonal axes 86. If sidewall portions 90 were to be perfectly circular, these forces would tend to act upon a relatively small surface area of base section 32. Such a concentration of force over a small area could impair the integrity of base section 32. In contrast, flattened peripheral sidewall portions 90 advantageously help distribute compression forces acting against base section 32 over a relatively broad area of base section 32 when tie bar housings 54 deflect during a clamping operation. It is believed that platens configured with such flattened sidewall portions would therefore tend to have a longer service life than platens without such a feature.

A plurality of ejector holes 92 are provided in moveable platen 14 in accordance with standard industry practices. Ejector plate 94 (shown in FIG. 3) is used to actuate ejection rods (not shown) through ejector holes 92 in order to eject parts and/or mold elements as desired.

Figure 11:
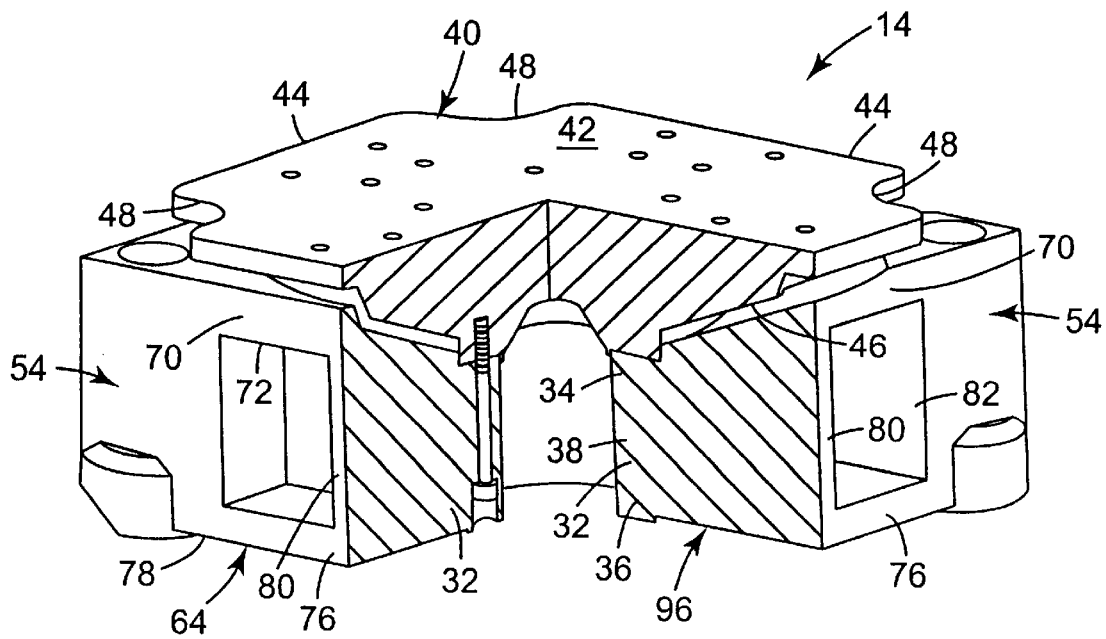
FIG. 11 is a perspective view with a quarter section broken away showing an alternative embodiment of a moveable platen of the present invention made from two separate components.
Figure 12:
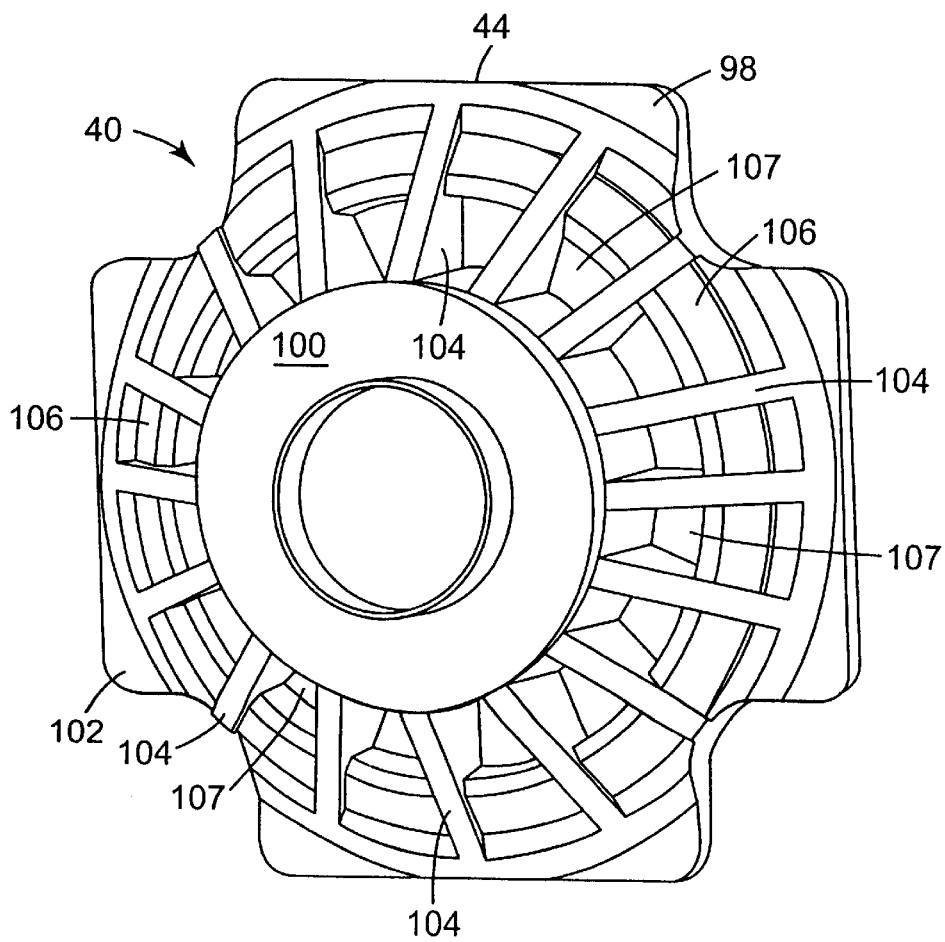
FIG. 12 is a perspective view of the underside of the mold support member of the moveable platen of FIG. 11.
Figure 13:
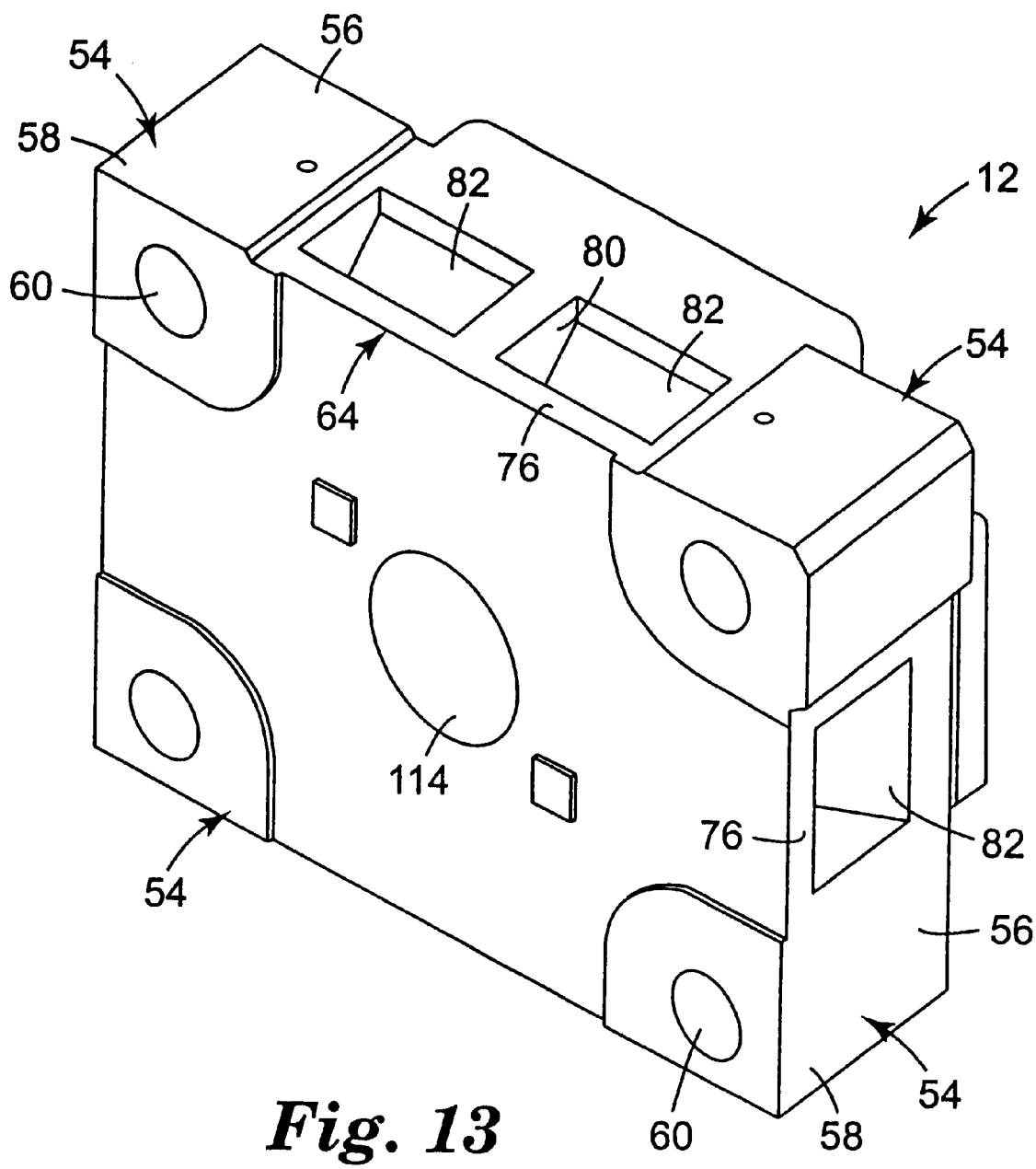
FIG. 13 is a perspective view of the stationary platen of FIG. 1 from a view point looking down at the backside, i.e., bottom, of the platen.
Figure 14:
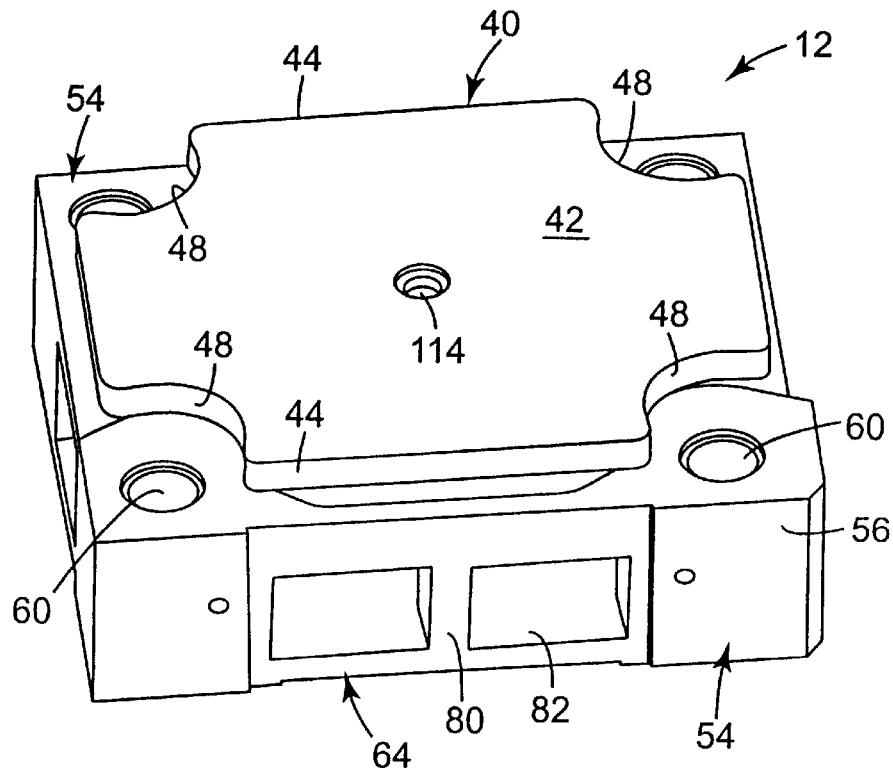
FIG. 14 is a perspective view of the stationary platen of FIG. 1 from a view point looking down at the mold mounting face, i.e., top of the platen.
Figure 15:
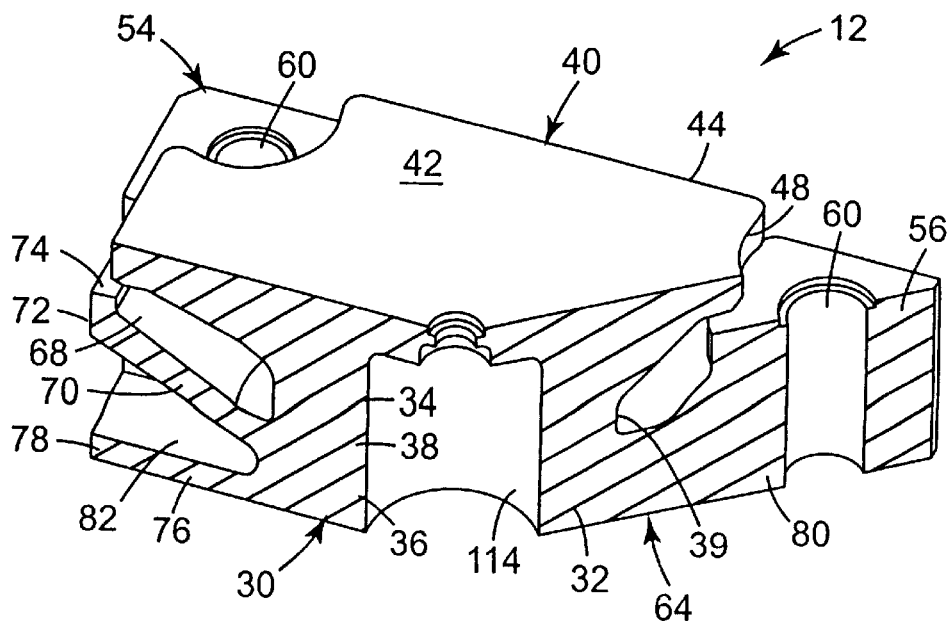
FIG. 15 is a perspective view of the stationary platen of FIG. 1 with a two-thirds section broken away.
Figure 16:
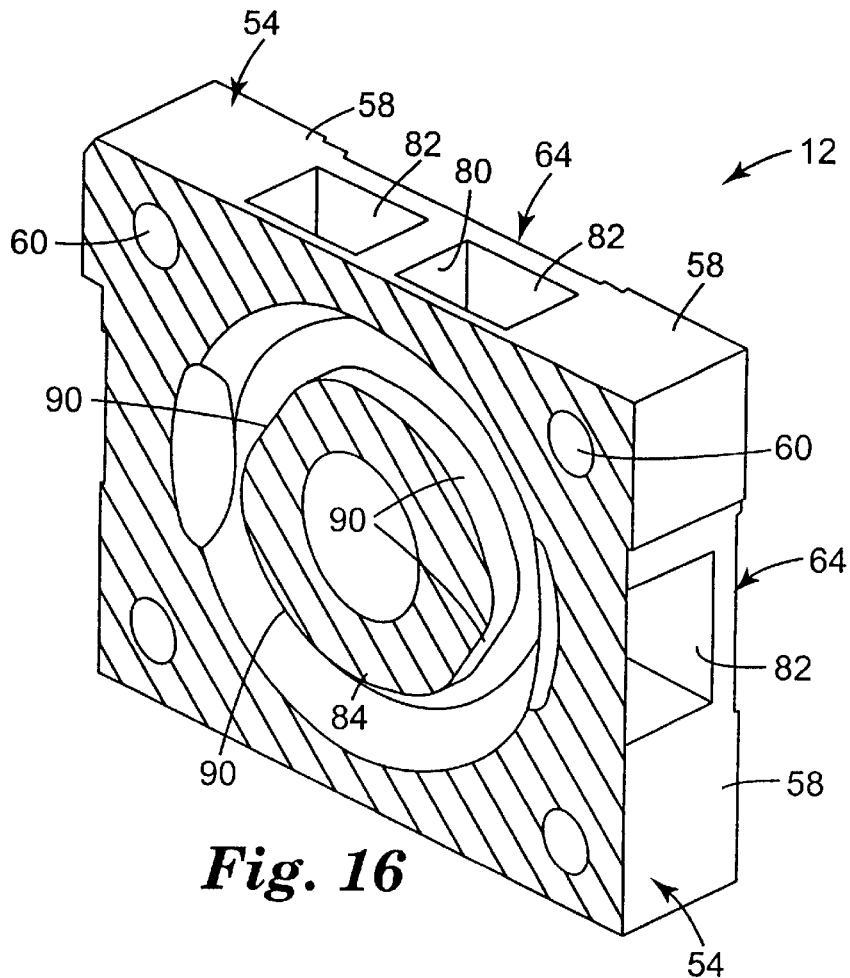
FIG. 16 is a perspective view of the stationary platen of FIG. 1 with a top portion broken away to show the configuration of the base section top portion.
Figure 17:
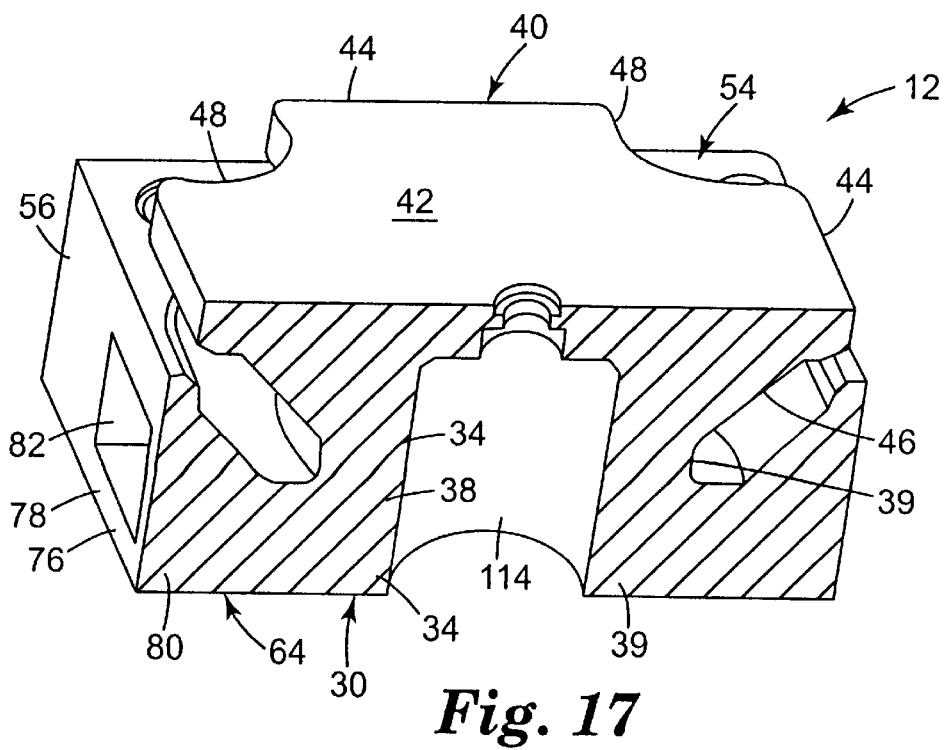
FIG. 17 is a perspective view of the stationary platen of FIG. 1 with a half section broken away to show a cross section of the platen taken along a midline axis through strengthening ribs.
Figure 18:
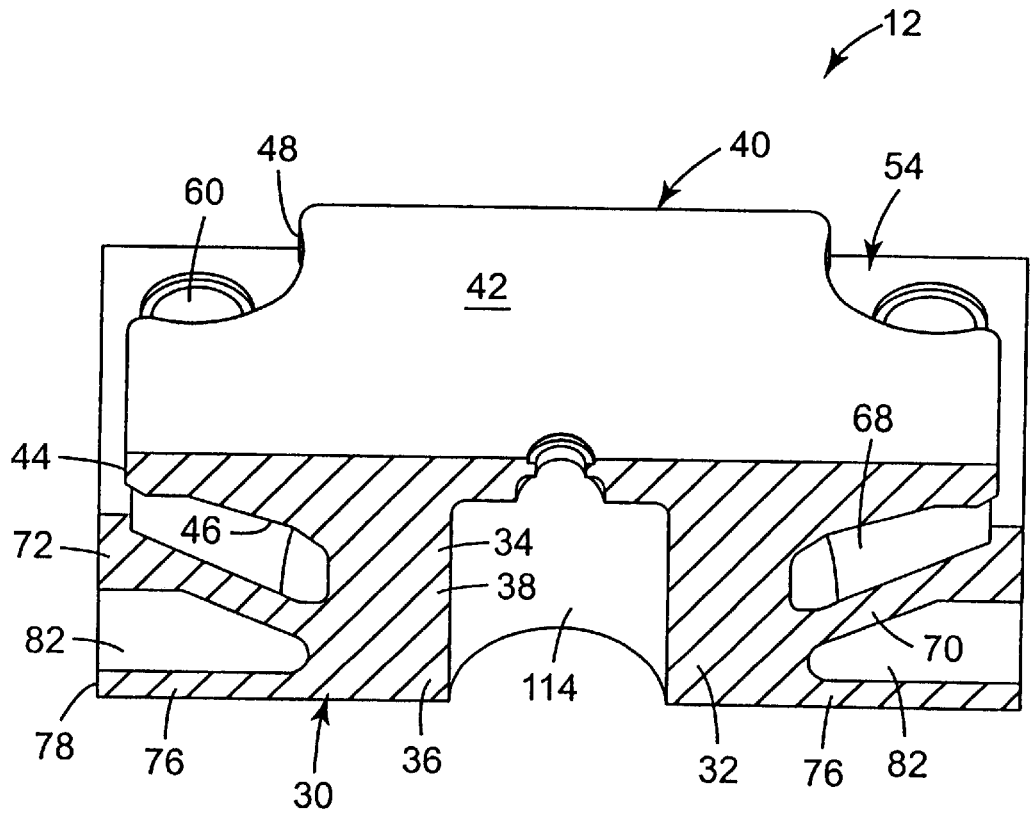
FIG. 18 is a perspective view of the stationary platen of FIG. 1 with a half section broken away to show a cross section of the platen taken along a midline axis through the side not including strengthening ribs.
Figure 19:
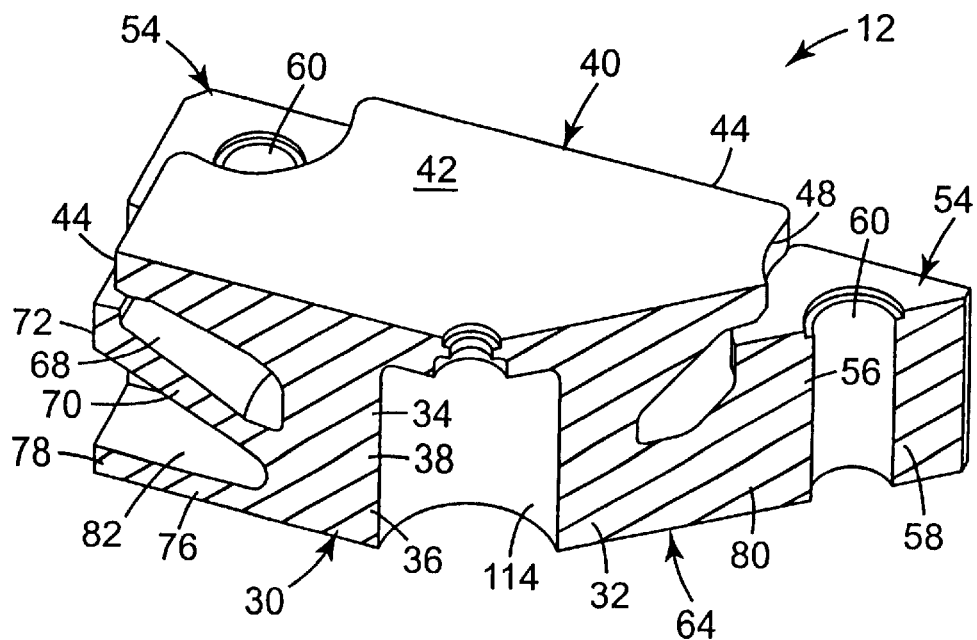
FIG. 19 is a perspective view of the stationary platen of FIG. 1 with a two-thirds section broken away.

The moveable platen 14 of FIGS. 2–7 is formed in its entirety from a one-piece, integral casting, but any platen embodiment of the present invention could be formed from a plurality of separate components if desired. For example, FIGS. 11–12 show an alternative embodiment of a moveable platen 14 configured identically to moveable platen 14 of FIGS. 2–7, except that moveable platen 14 of FIGS. 11–12 is formed from a separately formed mold support member 40 which is secured to a separately formed bottom member 96. As shown best in FIG. 11, mold support member 40 may be secured to bottom member 96 using any convenient fastening means, but is preferably secured to bottom 96 using fastening means which allows mold support member to be releasably secured in place to facilitate replacement. Bolts, screws, clamps, or the like would be suitable. FIG. 11 shows bolts being used for this purpose.

The two piece structure has numerous advantages. As one advantage, use of a separate mold support member 40 allows mold support member 40 to be easily replaced with a new component in the event that an alternative configuration were to be needed for a particular application, or in the event that mold support member 40 were to ever wear out or be damaged, or the like. This ability to replace or substitute alternative embodiments for mold support member 40 results in considerable economic savings for the user, because the bottom member 96 of the platen 14 need not be replaced at such a time.

As another advantage, use of a separate mold support member 40 allows the underside surface 98 of mold support member to be molded with performance enhancing features which are not as easily formed in embodiments in which entire platen 14 is formed as a one-piece structure. For example, representative examples of such performance enhancing features are shown in FIG. 12, which shows the underside surface 98 of a preferred embodiment of a separately formed mold support member 40. Referring to FIG. 12, underside surface 98 includes a centrally located collar 100 adapted for cooperative engagement with top portion 34 of base section 32. Outer peripheral surface 102 of underside surface 98 includes both radial strengthening ribs 104 and circumferential strengthening ribs 106. Advantageously, the spaces between ribs 104 and 106 form pockets 107, which enhance the lightweight characteristics of mold support member 40 without sacrificing the structural strength desired for clamping operations.

FIGS. 13–19 show stationary platen 12 in detail. Stationary platen 12 is generally identically structured to moveable platen 14, and similar features have been identified with the same reference numbers. However, unlike moveable platen 14, stationary platen 12 further includes through aperture 114. Through aperture 114 allows moldable fluid to be transported through base section 32 and mold support member 40 of stationary platen 12 for injection into the mold cavity (not shown) formed by mold elements (not shown) clamped between platens 12 and 14 during a molding operation. Although through aperture 114 is provided in stationary platen 12, through aperture 114 could also be formed in moveable platen 14 as an option.

Figure 20:
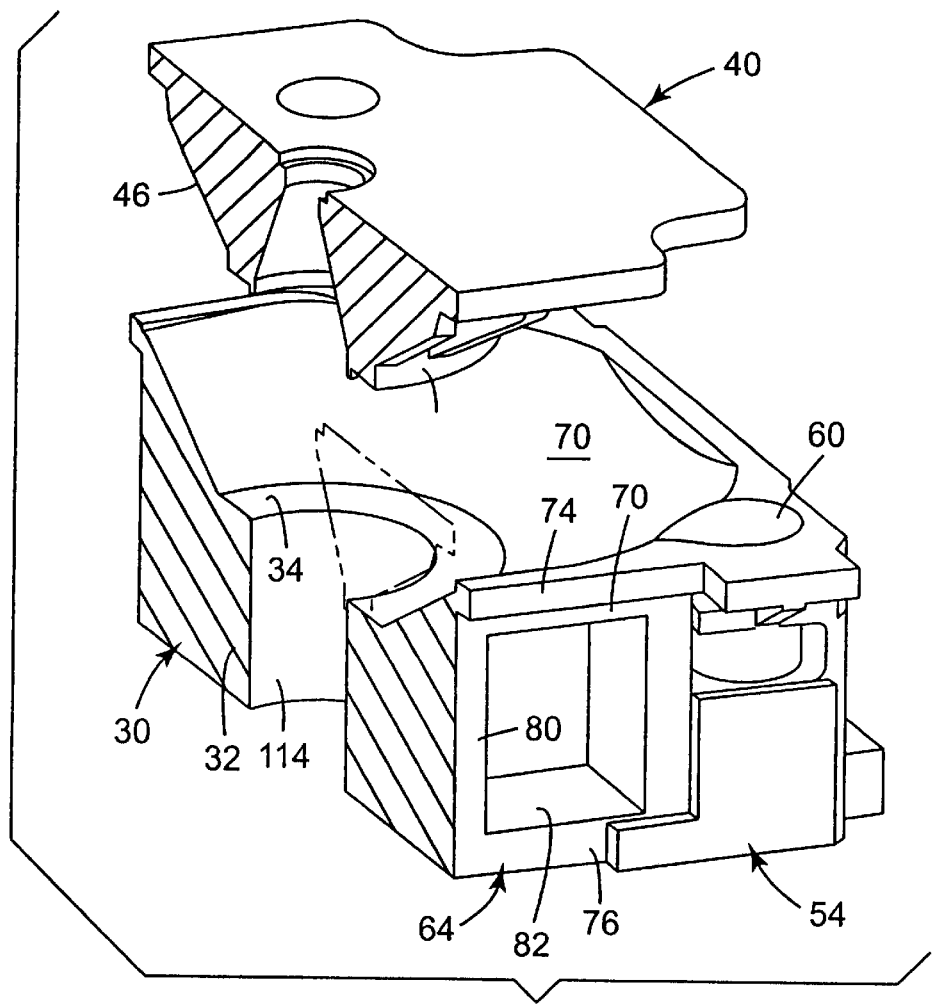
FIG. 20 is a perspective view with a half section broken away showing an alternative embodiment of a stationary platen of the present invention made from two separate components.
Figure 21:
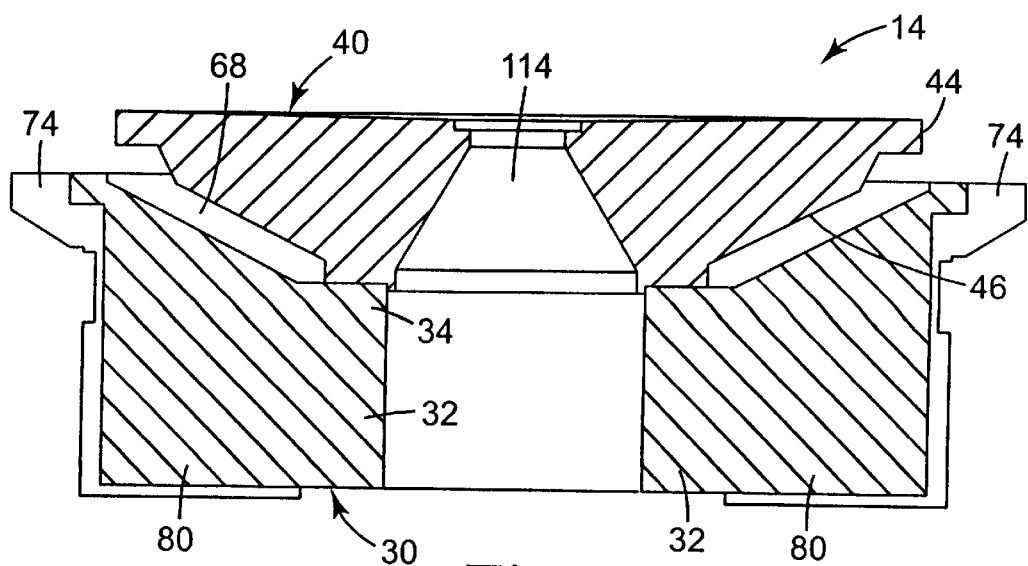
FIG. 21 is a side section view of the platen of FIG. 20.

FIGS. 20–21 show an alternative embodiment of a stationary platen 12 identical in all respects to stationary platen 12 of FIGS. 13–19, and similar features have been identified with the same reference numbers. However, stationary platen 12 of FIGS. 20–21 is a two-piece structure formed from a separate mold support member 40 which is releasably securable to bottom member 96.

In the practice of the present invention, platens 12 or 14, or other platen embodiments, may be formed from any variety of materials known to be suitable for forming platens. Representative examples of such materials include metals, metal alloys, and the like. Cast iron is a preferred material due to its strength, durability, easy moldability, and reasonable cost. Platens made from cast iron also have an extremely long service life when such platens are properly maintained and used.

Referring again primarily to FIG. 1, the operation of injection molding machine 10 during a typical molding operation will now be described. To begin with, first and second complementary mold elements (not shown) are provided, wherein the mold elements define a mold cavity (not shown) corresponding to a part to be molded when the mold elements are clamped together. Any mold elements known to be suitable for injection molding operations may be used in the practice of the present invention, and the present invention is not limited to any particular mold element design. The first and second mold elements are mounted to the moveable and stationary platens 12 and 14, respectively, in a manner such that relative movement of moveable platen 14 towards stationary platen 12 causes the mold elements to be registrably clamped together.

After the mold elements are mounted, hydraulic mechanisms 22 are actuated to move moveable platen 14 towards stationary platen 12 in order to clamp the mold elements together, thus closing the mold cavity. Additional hydraulic mechanisms (not shown), whose configurations are well known in the art, are then used to apply additional clamping pressure against the mold elements. Desirably, sufficient clamping force is applied so that molten molding material does not leak from the interface between the mold elements during the subsequent injection step in which molten material is injected under pressure into the mold cavity. In typical operations, such clamping pressure is commonly in the range from about 200 tons to about 10,000 tons, preferably 400 tons to 5,000 tons. However, the present invention is not to be limited to just these ranges, in that these ranges are only recited as two examples of suitable ranges of operation. Higher or lower clamping pressures could be used if desired.

After sufficient clamping force is applied, molten material is then injected into the mold cavity. Because stationary platen 12 is the platen of injection molding machine 10 which has the through aperture 114, the mold element mounted to stationary platen is configured with a suitable gate structure to allow fluid communication between through aperture 114 and the mold cavity to facilitate injection. After injection, the molten material is allowed and/or caused to solidify in the mold cavity to form the molded part. Hydraulic mechanisms, such as hydraulic mechanisms 22, which are operationally coupled to moveable platen 14 are then actuated to cause transport of moveable platen 14 and its corresponding mold element away from stationary platen 12, thus opening the mold cavity. Ejector plate 94 is then actuated to cause ejection rods (not shown) to eject the molded part.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A platen to be operationally coupled to a plurality of tie bars and being suitable for supporting a mold element in a clamping operation in which the platen is subjected to clamping forces, said platen comprising:
   (a) a mold supporting section comprising a mold support member having a mold mounting surface for receiving the mold element;
   (b) a plurality of tie bar engaging members spaced outward and apart from the mold supporting section; and
   (c) a flexible interconnecting structure coupling the tie bar engaging members to the mold supporting section, said flexible interconnecting structure comprising at least one interconnecting element which interconnects at least one tie bar engaging member to the mold supporting section and which is placed under tension during the clamping operation to allow said at least one tie bar engaging member to deflect upward relative to the mold supporting section in response to the clamping forces acting against the platen.

2. The platen of claim 1, wherein the mold supporting section comprises:
   (a) a base section having a top portion, a bottom portion, and an intermediate portion interconnecting the top and bottom portions; and
   (b) a mold support member having a top mold mounting surface and being supported on the top portion of the base section.

3. The platen of claim 2, wherein the base section and the mold support member are sufficiently robust such that the top mold mounting face undergoes substantially no deformation in a clamping force range from about 200 tons to about 5000 tons.

4. The platen of claim 2, wherein the interconnecting element extends outward and upward from the base section to said at least one tie bar engaging member.

5. The platen of claim 2, wherein the mold support member extends outward from around substantially the entire periphery of the base section top portion such that the mold support member is provided with a bottom surface.

6. The platen of claim 5, wherein at least an outer peripheral portion of the bottom surface of the mold support member is positioned above and spaced apart from the interconnecting element.

7. The platen of claim 6, wherein the bottom surface of the mold support member and the interconnecting element define an open channel extending around substantially the entire periphery of the base section, wherein the open channel extends diagonally downward in a direction generally from the outer periphery of the mold support member toward the base section.

8. The platen of claim 5, wherein at least a portion of the bottom surface of the mold support member angles diagonally upward in a direction generally from the base section toward an outer peripheral portion of the bottom overhanging surface.

9. The platen of claim 2, wherein the interconnecting element couples said at least one tie bar engaging member to the base section.

10. The platen of claim 2, wherein the interconnecting element extends outward from around substantially the entire periphery of the base section, the interconnecting element has an outer periphery, and wherein each of the tie bar engaging members are coupled to the outer periphery of the interconnecting element in a spaced apart relationship relative to each other.

11. The platen of claim 10, wherein the outer periphery of the interconnecting element is substantially rectilinear such that the interconnecting element is provided with four corner regions, and wherein a tie bar engaging member is coupled to the interconnecting element at each of said corner regions, respectively.

12. The platen of claim 1, wherein:
 (a) said interconnecting element is provided as an upper interconnecting element interconnecting an upper portion of at least one tie bar engaging member to the mold supporting section, wherein the upper interconnecting element extends diagonally downward in a direction from said at least one tie bar engaging member toward the mold supporting section; and
 (b) the flexible interconnecting structure further comprises a lower interconnecting element interconnecting a lower portion of said at least one tie bar engaging member to the mold supporting section in a manner such that the distance between the upper interconnecting element and the lower interconnecting element proximal said at least one tie bar engaging member is greater than the distance between the upper interconnecting element and the lower interconnecting element proximal to the mold supporting section.

13. The platen of claim 12, wherein the mold supporting section comprises:
 (a) a base section having a top portion, a bottom portion, and an intermediate portion interconnecting the top and bottom portions; and
 (b) a mold support member having a top mold mounting surface and being supported on the top portion of the base section.

14. The platen of claim 13, wherein the upper and lower interconnecting elements interconnect said at least one tie bar engaging member with the base section.

15. The platen of claim 13, wherein each of the upper and lower interconnecting elements extend outward from around substantially the entire periphery of the base section, and wherein each of the upper and lower interconnecting elements have an outer periphery, and wherein each of the tie bar engaging members is coupled to the outer peripheries of said upper and lower interconnecting elements in a spaced apart relationship relative to each other.

16. The platen of claim 13, wherein the mold support member has an outer periphery which is positioned radially outward from around substantially the entire periphery of the base section top portion such that the mold support member is provided with a bottom surface, and wherein at least an outer peripheral portion of the bottom surface of the mold support member is positioned above and spaced apart from the upper interconnecting element.

17. The platen of claim 13, wherein the outer periphery of each of the upper and lower interconnecting elements are substantially rectilinear such that each of the upper and lower interconnecting elements are provided with four corner regions.

18. The platen of claim 17, and wherein the substantially rectilinear outer peripheries of the upper and lower interconnecting elements are registrably aligned such that the corner regions of the upper interconnecting element are positioned substantially directly above the corresponding corner regions of the lower interconnecting element, and wherein the tie bar engaging members are coupled to corresponding corner regions of the upper and lower interconnecting elements, respectively.

19. The platen of claim 12, wherein the flexible interconnecting structure further comprises at least one strengthening rib interconnecting the upper interconnecting element to the lower interconnecting element.

20. The platen of claim 2, wherein the base section comprises at least one flattened peripheral sidewall portion which is characterized by a flattened degree of curvature relative to the degree of curvature of the sidewall of a perfect cylinder, wherein said flattened peripheral sidewall portion opposes a corresponding tie bar engaging member along a diagonal axes between the base section and the tie bar engaging member.

21. The platen of claim 20, wherein the base section includes a flattened peripheral sidewall portion for each of the tie bar engaging members.

22. The platen of claim 1, wherein the platen is formed from at least two components, wherein one of the components is a separately formed mold support member.

23. The platen of claim 22, wherein the separately formed mold support member comprises an underside which includes a central collar for engaging the base section, an outer peripheral surface extending radially outward from the central collar, and a plurality of strengthening ribs positioned on the outer peripheral surface.

24. The platen of claim 23, wherein the strengthening ribs comprise at least one rib extending in a substantially radial direction along the outer peripheral surface of the mold support member underside.

25. The platen of claim 23, wherein the strengthening ribs comprise at least one rib extending in a substantially circumferential direction along the outer peripheral surface of the mold support member underside.

26. The platen of claim 1, wherein the mold support member comprises a plurality of cut out portions, said cut out portions providing pathways for the tie bars to pass from one side of the platen to the other without contacting the mold support member during the clamping operation.

27. A platen to be operationally coupled to a plurality of tie bars and being suitable for supporting a mold in a clamping operation in which the platen is subjected to clamping forces, said platen comprising:
 (a) a mold supporting section, comprising
  (i) a base section having a top portion, a bottom portion, and an intermediate portion interconnecting the top and bottom portions; and
  (ii) a mold support member having a top mold mounting surface and being supported on the top portion of the base section;
 (b) a plurality of tie bar engaging members spaced outward and apart from the mold supporting section; and
 (c) a flexible interconnect structure coupling the tie bar engaging members to the base section in a manner to allow one or more of the tie bar engaging members to deflect in response to the clamping forces acting against the platen during the clamping operation.

28. The platen of claim 27, wherein the base section and the mold support member are sufficiently robust such that the top mold mounting face undergoes substantially no deformation in a clamping force range from about 200 tons to about 5000 tons.

29. The platen of claim 27, wherein the flexible interconnect structure comprises an interconnecting element that extends outward and upward from the base section to said at least one tie bar engaging member.

30. The platen of claim 29, wherein the mold support member extends outward from around substantially the entire periphery of the base section top portion such that the mold support member is provided with a bottom surface.

31. The platen of claim 30, wherein at least an outer peripheral portion of the bottom surface of the mold support member is positioned above and spaced apart from the interconnecting element.

32. The platen of claim 31, wherein the bottom surface of the mold support member and the interconnecting element define an open channel extending around substantially the entire periphery of the base section, wherein the open channel extends diagonally downward in a direction generally from the outer periphery of the mold support member toward the base section.

33. The platen of claim 30, wherein at least a portion of the bottom surface of the mold support member angles diagonally upward in a direction generally from the base section toward an outer peripheral portion of the bottom overhanging surface.

34. The platen of claim 29, wherein the interconnecting element extends outward from around substantially the entire periphery of the base section, the interconnecting element has an outer periphery, and wherein each of the tie bar engaging members are coupled to the outer periphery of the interconnecting element in a spaced apart relationship relative to each other.

35. The platen of claim 34, wherein the outer periphery of the interconnecting element is substantially rectilinear such that the interconnecting element is provided with four corner regions, and wherein a tie bar engaging member is coupled to the interconnecting element at each of said corner regions, respectively.

36. The platen of claim 29, wherein:
(a) said interconnecting element is provided as an upper interconnecting element interconnecting an upper portion of at least one tie bar engaging member to the mold supporting section, wherein the upper interconnecting element extends diagonally downward in a direction from said at least one tie bar engaging member toward the mold supporting section; and
(b) the flexible interconnecting structure further comprises a lower interconnecting element interconnecting a lower portion of said at least one tie bar engaging member to the mold supporting section in a manner such that the distance between the upper interconnecting element and the lower interconnecting element proximal said at least one tie bar engaging member is greater than the distance between the upper interconnecting element and the lower interconnecting element proximal to the mold supporting section.

37. The platen of claim 36, wherein each of the upper and lower interconnecting elements extend outward from around substantially the entire periphery of the base section, and wherein each of the upper and lower interconnecting elements have an outer periphery, and wherein each of the tie bar engaging members is coupled to the outer peripheries of said upper and lower interconnecting elements in a spaced apart relationship relative to each other.

38. The platen of claim 37, wherein the outer periphery of each of the upper and lower interconnecting elements are substantially rectilinear such that each of the upper and lower interconnecting elements are provided with four corner regions.

39. The platen of claim 38, and wherein the substantially rectilinear outer peripheries of the upper and lower interconnecting elements are registrably aligned such that the corner regions of the upper interconnecting element are positioned substantially directly above the corresponding corner region of the lower interconnecting element, and wherein the tie bar engaging members are coupled to corresponding corner regions of the upper and lower interconnecting elements, respectively.

40. The platen of claim 36, wherein the mold support member has an outer periphery which is positioned radially outward from around substantially the entire periphery of the base section top portion such that the mold support member is provided with a bottom surface, and wherein at least an outer peripheral portion of the bottom surface of the mold support member is positioned above and spaced apart from the upper interconnecting element.

41. The platen of claim 36, wherein the flexible interconnecting structure further comprises at least one strengthening rib interconnecting the upper interconnecting element to the lower interconnecting element.

42. The platen of claim 27, wherein the base section comprises at least one flattened peripheral sidewall portion which is characterized by a flattened degree of curvature relative to the degree of curvature of the sidewall of a perfect cylinder, wherein said flattened peripheral sidewall portion opposes a corresponding tie bar engaging member along a diagonal axes between the base section and the tie bar engaging member.

43. The platen of claim 42, wherein the base section includes a flattened peripheral sidewall portion for each of the tie bar engaging members.

44. The platen of claim 27, wherein the platen is formed from at least two components, wherein one of the components is a separately formed mold support member.

45. The platen of claim 44, wherein the separately formed mold support member comprises an underside which includes a central collar for engaging the base section, an outer peripheral surface extending radially outward from the central collar, and a plurality of strengthening ribs positioned on the outer peripheral surface.

46. The platen of claim 45, wherein the strengthening ribs comprise at least one rib extending in a substantially radial direction along the outer peripheral surface of the mold support member underside.

47. The platen of claim 45, wherein the strengthening ribs comprise at least one rib extending in a substantially circumferential direction along the outer peripheral surface of the mold support member underside.

48. The platen of claim 27, wherein the mold support member comprises a plurality of cut out portions, said cut out portions providing pathways for the tie bars to pass from one side of the platen to the other without contacting the mold support member during the clamping operation.

49. A platen to be operationally coupled to a plurality of tie bars and being suitable for supporting a mold in a clamping operation in which the platen is subjected to clamping forces, said platen comprising:
(a) a central base section having a peripheral sidewall, a top portion, and a bottom portion;
(b) a mold support member having a top mold mounting surface and being supported on the top portion of the central base section;

(c) a plurality of tie bar engaging members spaced apart and outward from the mold supporting section, wherein each tie bar engaging member has an upper portion and a lower portion;

(d) an upper interconnecting element extending outward and diagonally upward from the central base section, wherein the upper interconnecting element interconnects the center base section with an upper portion of at least one tie bar engaging member; and (e) a lower interconnecting element extending outward from the central base section, wherein the lower interconnecting element interconnects the center base section with a lower portion of at least one tie bar engaging member.

50. An injection molding machine including at least one platen operationally coupled to a plurality of tie bars, said at least one platen comprising:

(a) a mold supporting section comprising a mold support member having a mold mounting surface for receiving the mold;

(b) a plurality of tie bar engaging members spaced apart from the mold supporting section; and (c) a flexible interconnecting structure coupling the tie bar engaging members to the mold supporting section, said flexible interconnecting structure comprising at least one interconnecting element which interconnects at least one tie bar engaging member to the mold supporting section and which is placed under tension during the clamping operation to allow said at least one tie bar engaging member to deflect upward relative to the mold supporting section in response to the clamping forces acting against the platen.

* * * * *